United States Patent [19]
Caamano

[11] Patent Number: 5,296,872
[45] Date of Patent: Mar. 22, 1994

[54] CUTTING DEVICE FOR A PLOTTER

[75] Inventor: Ventura Caamano, Barcelona, Spain

[73] Assignee: Hewlett-Packard Company, Palo Alto, Calif.

[21] Appl. No.: 879,628

[22] Filed: May 7, 1992

[30] Foreign Application Priority Data

May 10, 1991 [EP] European Pat. Off. ........ 91500042.6

[51] Int. Cl.⁵ ............................................. B41J 11/70
[52] U.S. Cl. ..................................... 346/24; 400/621
[58] Field of Search ................ 346/24; 400/621, 353, 400/120 HE; 83/485, 614; 358/304

[56] References Cited

U.S. PATENT DOCUMENTS

| 3,951,252 | 4/1976 | Selke et al. ................ 197/1 R |
| 4,211,498 | 7/1980 | Shimizu et al. ............ 400/621 |
| 4,312,597 | 1/1982 | Shimizu et al. ............ 400/621 |
| 4,525,088 | 6/1985 | Shipos et al. ............... 400/621 |
| 4,617,577 | 10/1986 | Takahashi et al. ........ 346/76 PH |
| 4,734,716 | 3/1988 | Silverberg et al. ............ 346/24 |
| 4,979,838 | 12/1990 | Yokota et al. ............. 400/621 |

FOREIGN PATENT DOCUMENTS

| 0172319 | 2/1986 | European Pat. Off. . |
| 512184 | 11/1992 | European Pat. Off. . |
| 3119998 | 12/1982 | Fed. Rep. of Germany . |
| 2507525 | 12/1982 | France . |
| 2642009 | 7/1990 | France . |
| 1416714 | 12/1975 | United Kingdom . |

*Primary Examiner*—Benjamin R. Fuller
*Assistant Examiner*—N. Le

[57] ABSTRACT

The invention refers to a cutting device for a plotter for automatic cutting of a paper band on which markings are formed by marking means, the plotter comprising a marker carriage for receiving the marking means and for moving the marking means in a direction transverse to the movement of the paper band, with the cutting device comprising a cutting element and in which the cutting element is arranged on a cutter carriage means being provided for the selective engagement or disengagement of the cutter carriage to or from the marker carriage. During a cutting operation the cutter carriage is engaged to the marker carriage and moved across the paper band due to the movement of the marker carriage. The marking means comprise a pen which can be disengaged from the marker carriage during a cutting operation. The driving means for the engagement and disengagement of the cutter carriage are the same as those for raising or lowering the drafting pens.

6 Claims, 7 Drawing Sheets

CUTTING DEVICE FOR A PLOTTER

CROSS REFERENCE TO RELATED APPLICATIONS, IF ANY

None.

BACKGROUND OF THE INVENTION

This invention refers to a cutting device for a plotter for carrying out the cutting of the paper band at the end of a plotting cycle.

The application of this invention is foreseen for plotters which have a continuous paper band consisting of a roll of paper incorporated on the plotter, so that at the end of each plotting cycle, a paper band length has to be cut which comprises the graphic representation drawn by the plotter.

According to the present state of the art, a number of devices have been disclosed for cutting the paper band in plotters and printers.

To obtain high quality cuts of the paper band, sliding carriages are usually provided to cut the paper. Such cutter carriages are independent of the plotting carriage or printing device, having independent motors and transmission systems to produce the displacement of the cutting carriage along straight guides in order to carry out the cutting of the paper band usually by means of a rotating cutter.

Thus, as an example, German Patent DE3119998 discloses a device for the cutting of a continuous paper band comprising a carriage which may slide along specific guides and which has a motor to operate a toothed belt which is connected to a wheel incorporated on the shaft carrying the rotating cutter. This prior disclosure shows as well a couple of angle shaped plates for the guidance of the continuous paper band in the vicinity of the cutter carriage.

In other cases, straight cutters are provided to act on the whole width of the continuous paper band, practically with a single stroke.

An example of this technique is disclosed in U.S. Pat. No. 4,617,577, which shows a device for the cutting of paper sheets by means of a rotating cutter which has a swiveling movement from a rest position up to a cutting position, coming back to the starting position after each cutting cycle. In this case, there is no movable carriage as the cutting is carried out in only one stroke on the whole width of the paper sheet.

This system does not permit to obtain high quality cuts on the paper band as the cutting action is simply carried out by compression between the swiveling cutter and the fixed cutter. Besides, the system is not appropriate for great paper band widths.

SUMMARY OF THE INVENTION

Relative to the prior art, it is an object of the present invention to provide a cutting device for a plotter as in the preamble of claim 1 which ensures high quality cuts of the paper band and which has a simple construction. In this technique a high quality of the cut of the paper is associated with a clean, burr free cut, which does not show any substantial deformation of the opposed borders resulting from the cutting action.

This object is solved by the characterizing features of claim 1 in that a cutter carriage is provided which is engageable with and disengageable from the pen carriage which supports the pens for producing the graphic representations in the plotter. The invention thus has the advantage that it does not require independent driving means for the cutting device which leads to a particularly simple construction.

According to a preferred embodiment of the present invention, an engageable cutter carriage has a rotating cutter which overlaps on a fixed cutter blade. The rotating cutter is incorporated by means of a floating assembly on the engageable cutter carriage and has means to produce the rotation of the cutter as a result of the straight displacement of the cutter carriage, without the need of specific transmission means or independent driving motors for the cutting device.

According to the present invention, the cutter carriage stays in a rest or parking position on one end of the guideways for the pen carriage, which supports the pens used for plotting the graphic representation, while such pen carriage is being operated during a plotting cycle. At the end of the plotting cycle, when the graphic representation has been completed, the pen carriage will grab the cutter carriage from its parking position by means of a mechanical engagement system, drawing the cutter carriage along its guideways, such straight travel being transformed in a cutting action of the rotating cutter. After the cutting operation. When the pen carriage comes back to the position in which the engagement with the cutter carriage has taken place, the pen carriage disengages again the cutter carriage, which will stay again in the parking position. Then, the pen carriage may perform its normal duty in a new plotting cycle.

The engagement and disengagement of the pen carriage relatively to the cutter carriage is carried out according to the present invention by means of a hook which forms part of a swiveling lever which is assembled with rotating capacity on a shaft of the pen carriage, so that the swiveling of the lever defines two positions for the same, one of which corresponds to the engagement of the cutter carriage and the other corresponds to the disengagement after parking the cutter carriage in the rest position. The operation of the swiveling lever which incorporated the engagement hook is carried out, according to the present invention, by means of a magnet which coil is excited in a direct or reversed sense, according to the engagement and disengagement of the cutter carriage. Both raising and lowering actions of the magnet will be used as well for raising and lowering the drafting pen.

The invention is preferably used in plotters of the type known from Hewlett-Packard Journal, Nov. 1981, wherein the drafting pen is moved forward and backwards in a first direction and the paper is moved in a second direction perpendicular to the first direction.

The present invention will allow to obtain a number of important advantages over the previous art, among which:

Suppression of independent motors and driving means for the cutter, with the subsequent gains in simplicity and reliability of the paper cutting device;

Great simplicity, hence reliability and low cost of the cutting means, which allows at the same time to obtain high quality cuts on many different types of paper band without need of any mechanisms to secure the paper.

Lower weight of the pen carriage, specially during its normal operation as drafting means, allowing faster acceleration and stoppage and all inherent advantages related with a lower inertia;

The same carriage will perform both drafting and paper cutting functions;

The same driving means will be used for operating the engagement/disengagement of the cutter carriage as well as the raising and lowering of the pens.

The design of the cutting device is adapted to the structure of the plotter and not vice-versa. It will use the existing guideways and may be easily applied to upgrading existing plotters which donnot have any automatic cutting system.

Very simple assembly/disassembly, for an easy maintenance.

The invention will be explained in more detail in the following making reference to a preferred execution of the same. In the drawings:

DESCRIPTION OF THE PREFERRED EMBODIMENTS

Figure 1:
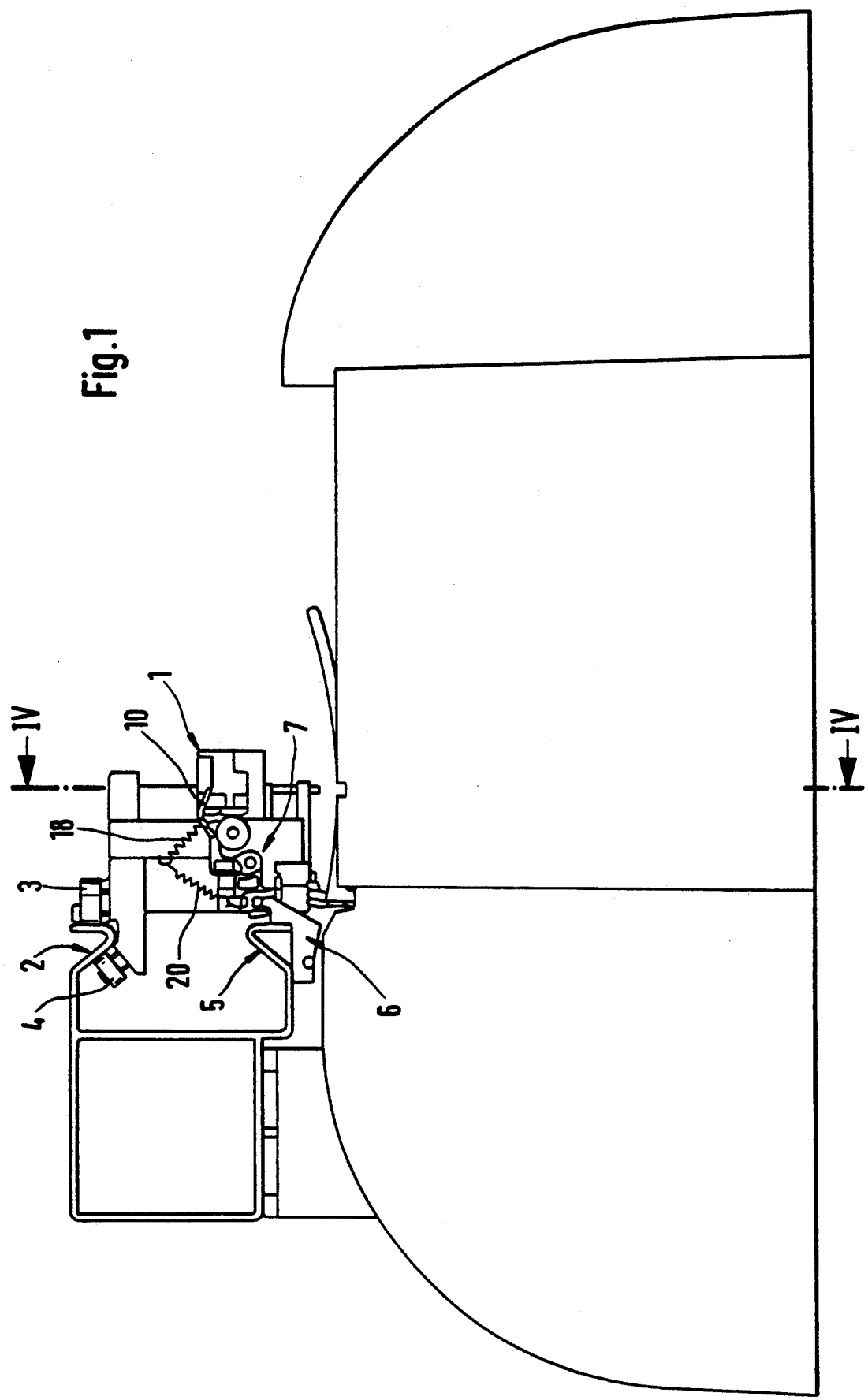
FIG. 1 shows a side view of the pen carriage resting on its guides.
Figure 2:
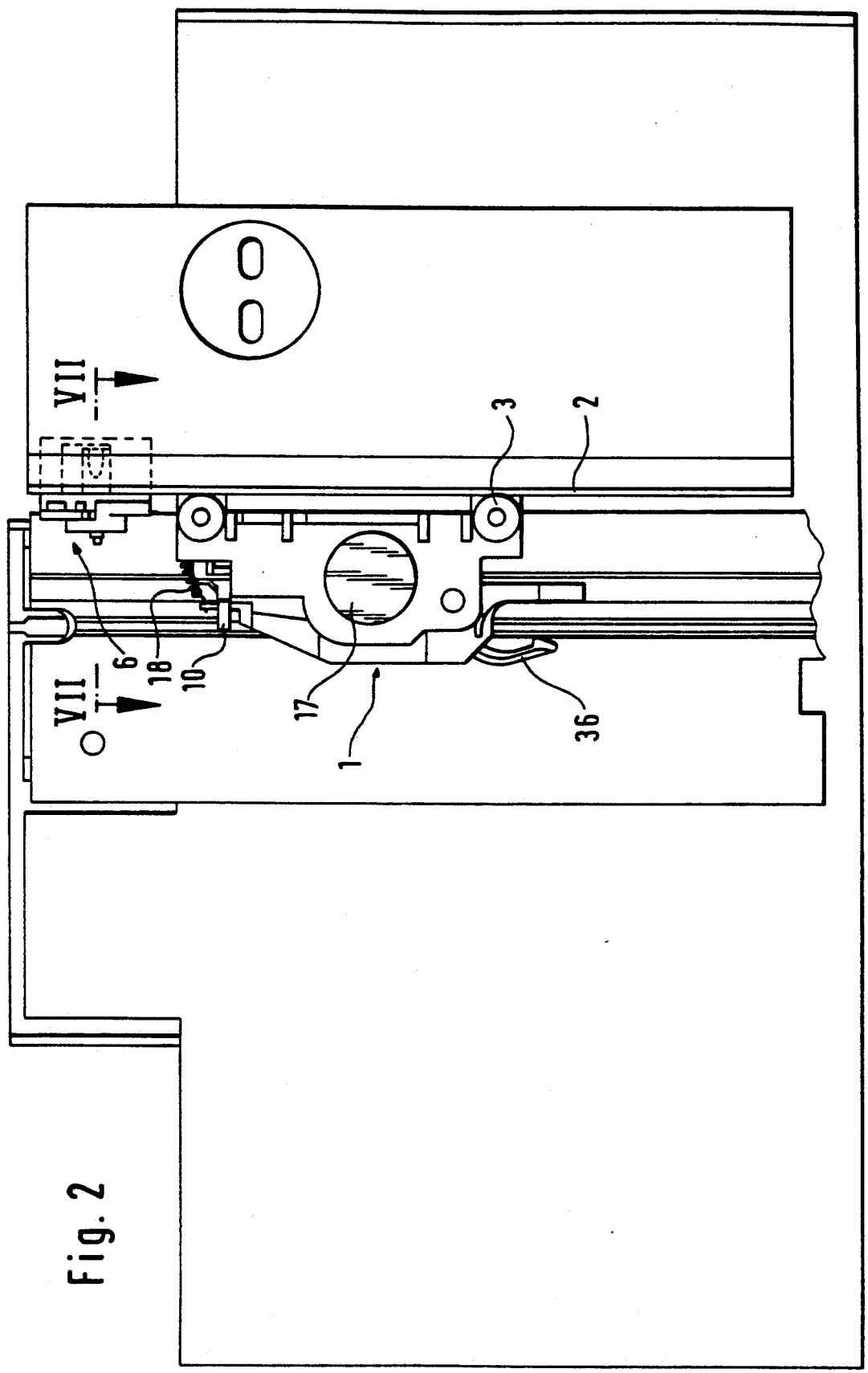
FIG. 2 is an upper view showing in higher detail the pen carriage of FIG. 1.
Figure 3:
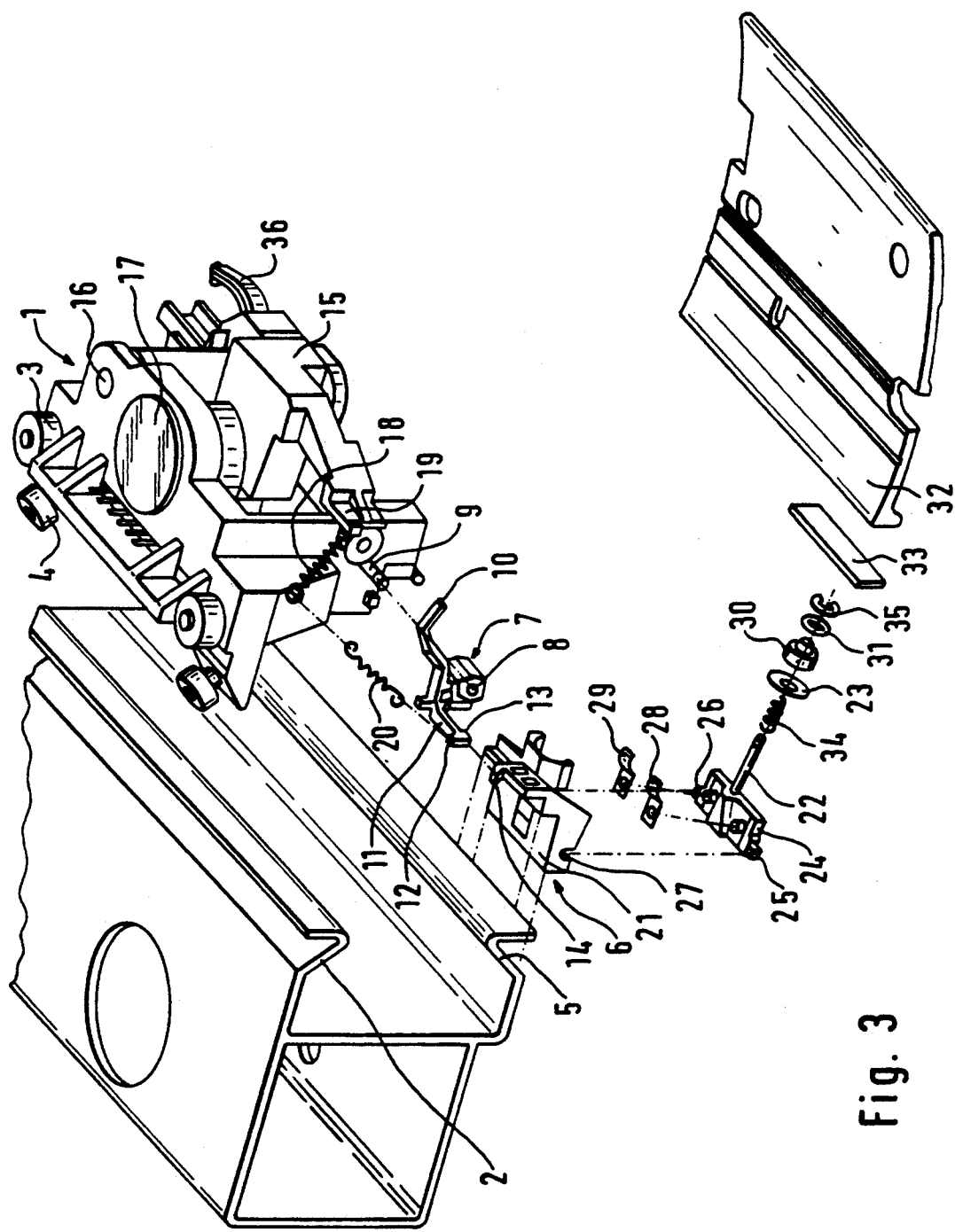
FIG. 3 is an exploded view of the elements comprising the cutter carriage showing its positioning relatively to the pen carriage.
Figure 4:
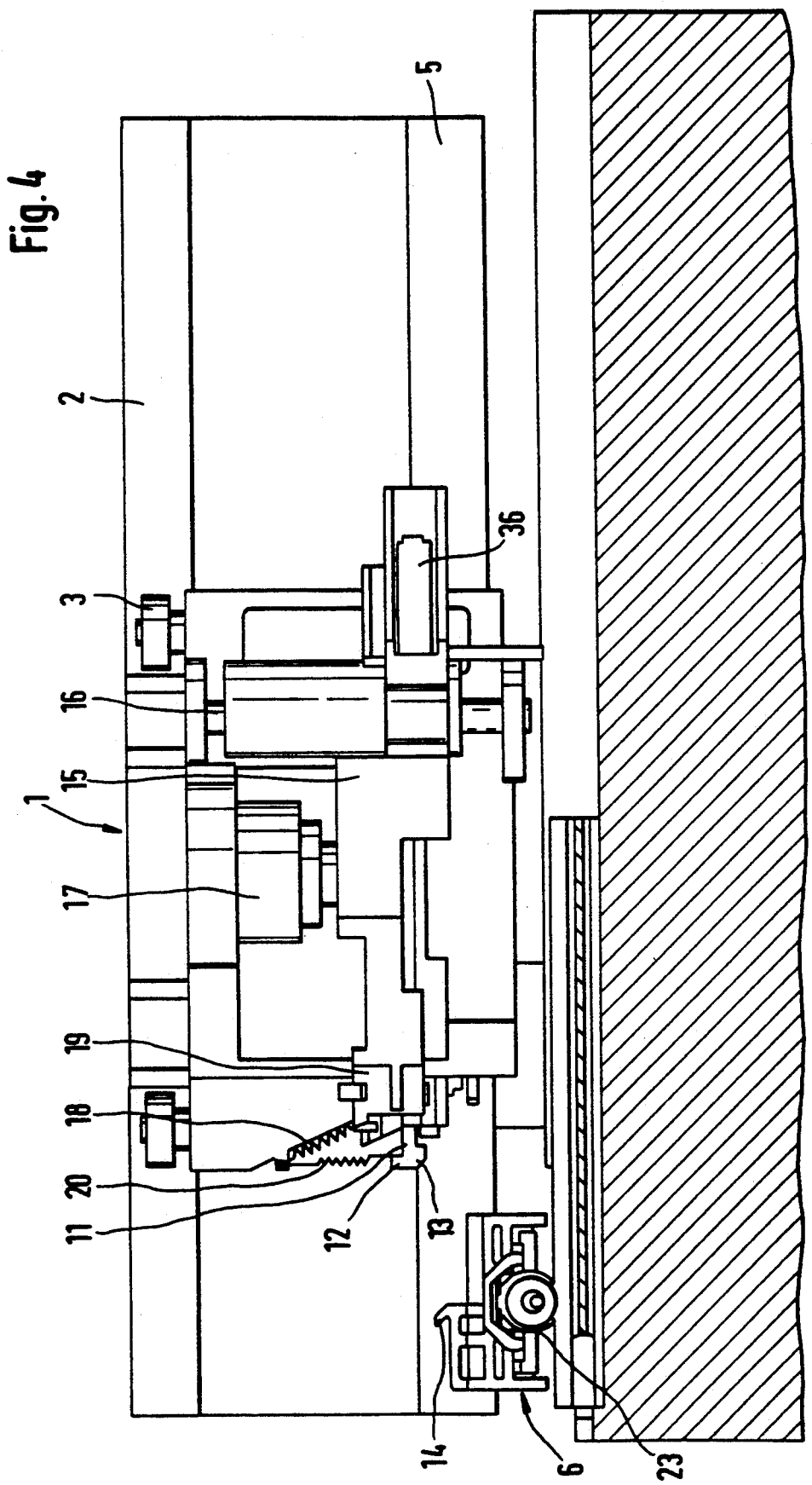
FIG. 4 shows a section along IV—IV of FIG. 1 showing the pen carriage and the cutter carriage disengaged from each other.
Figure 5:
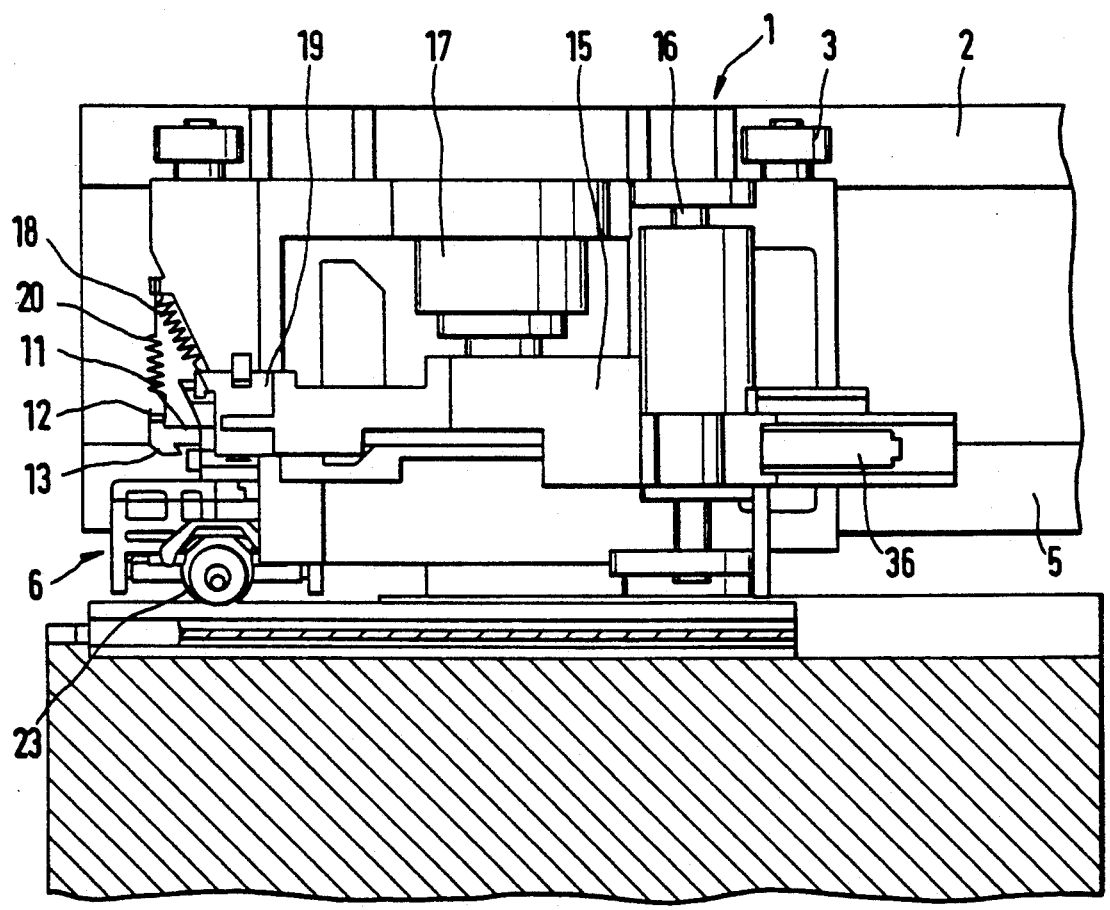
FIG. 5 shows a view similar to FIG. 4 with the pen carriage and the cutter carriage in the first step of its mutual engagement.

According to the FIGS. 1-3, the cutting device for plotters, for the automatic cutting of a paper band, according to this invention, may be applied to a plotter in which the marker carriage or pen carriage, which has been designated with reference numeral -1-, rests on an upper guiding rail -2- on which it may travel on rollers -3- and -4-, resting as well as on a lower angled guide -5-. The carriage -1- may travel from one end to the other of its stroke sliding on the above mentioned guideways carrying out the drawing of the graphic representation according to the control instructions which govern the operation of the pen carriage. The graphic representation is conventionally drawn on a continuous paper band which has not been shown in the figures. The paper band progressively advances during the operation of the plotter, combining the straight displacement of pen carriage -1- on its straight guides with the displacement of the paper sheet on a direction which is perpendicular to such guides. The cutting of the paper band has to take place after the graphic representation has been completed.

According to this invention, the cutting of the paper band at the end of the plotting operation is carried out by means of a cutter carriage shown by means of reference number -6-, which will rest, when not in operation, in a parking position on one of the ends of the straight guide -5-, which in the case of the figures corresponds to the left end. The cutter carriage -6- will be engaged by the pen carriage -1- at the moment in which the cutting of the paper band has to be carried out. The cutter carriage -6- will be parked again in its rest position at the end of the cutting operation.

The engagement between the pen carriage -1- and the cutter carriage -6- may be obtained by any conventional method known in this technique. According to the present invention, such connection will be made in a mechanical way by means of swiveling lever -7-, FIG. 3, which has a central hub -8- which may rotate on shaft -9- incorporated to the pen carriage -1-. Lever -7- has in one end the arm -10- which will receive the operating stroke of a pusher to be explained later. Said lever has at the other end, opposed to such arm -10-, a hook constituted by a second arm -11- parallel to the straight displacement guide for pen carriage -1-, ending such arm in a head portion -12- which has a lower angled protrusion -13- which may engage a similar mating hook -14- which the cutter carriage -6- incorporates on its upper part. The head portion -12- is connected to antagonistic helical spring -20-.

The position in which the engagement between the portions -13- and -14- may be effected corresponds to one of the two stable positions for lever -7- corresponding to the vertical displacement of a pusher -15- vertically guided on pen carriage -1-, preferably by means of a vertical axis which upper end has been shown by reference numeral -16- in FIG. 3. To activate pusher -15- a magnet -17- will be preferably provided in the present invention, which magnet will be assembled on pen carriage -1-, being able to activate the descent of pusher -15- against the action of spring -18-. The straight edge -19- of pusher -15- acts on the lower portion of arm -10- of lever -7- in a way that the descent of pusher -15- will release lever -7-, allowing its rotation under the action of spring -20-. When the driving action of pusher -15- is inverted, the spring -20- will return the hook's arm -11- to its rest position. The driving action of magnet -17- on pusher -15- will be used also for raising and lowering the drafting pen, associated to clamping means -36-. The pen will be removed from cutter carriage -6- during each cutting operation.

When pen carriage -1- travels towards the end of the guideways in which the cutter carriage -6- is parked in its rest position having hook -13- in the position to engage the mating portion -14- of the cutter carriage after the activation of lever -7- as above explained, the cutter carriage will be drawn by the pen carriage along the guideways for the same, activating the cutting action of the rotating cutter on the paper band in a way that will be explained in the following.

Figure 6:
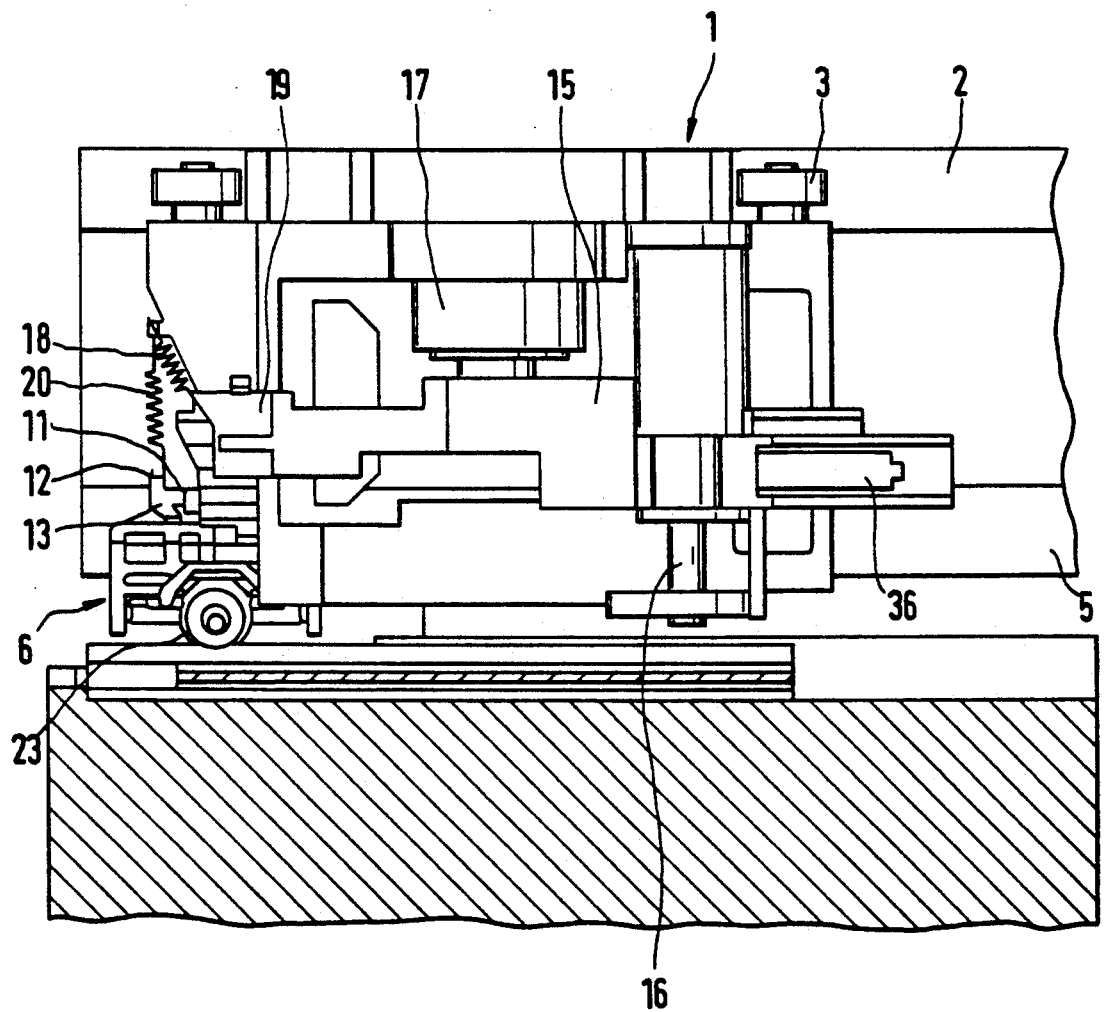
FIG. 6 is a similar view to FIGS. 4 and 5 showing the pen carriage and the cutter carriage mutually engaged.
Figure 7:
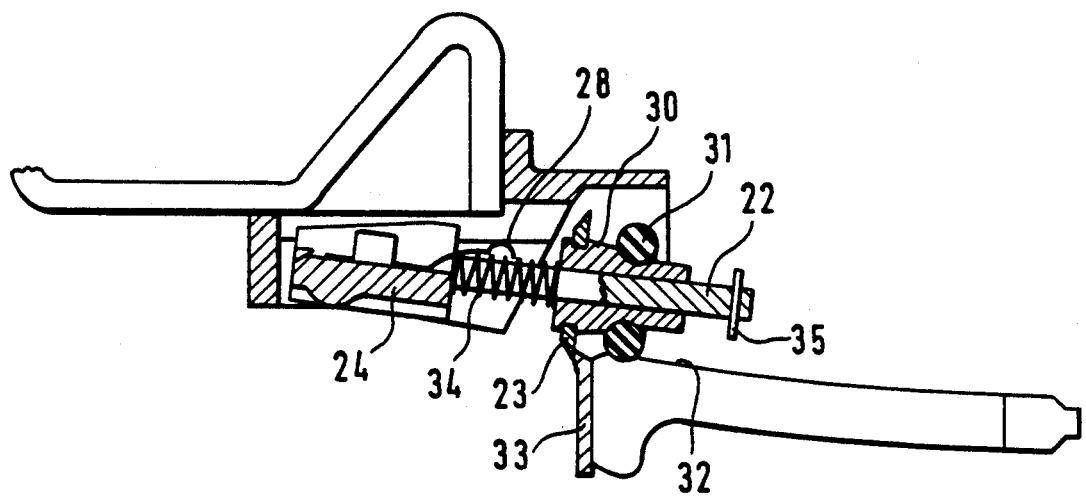
FIG. 7 shows a section along VII—VII of FIG. 2 corresponding to the cutter carriage.

Cutter carriage -6- has a main body -21- with an upper engaging portion or hook -14-. At the same time it receives the swiveling shaft -22- on which the rotating cutter -23- is assembled. As shown in FIGS. 6 and 7, the shaft -22- is assembled with rotating capacity on carrier block -24-, which has two end protrusions or pins -25- and -26- lodged inside holes of body -21- which holes have side openings, one of which has been shown with reference number -27-. Flat springs -28- and -29- are assembled on carrier block -24- acting against the inside surface of body -21- and exerting an antagonistic action against the upwards swiveling of shaft -22-.

A rotating cutter -23- is assembled on shaft -22- by means of a supporting body or block -30- which has sliding and rotating capacity on shaft -22-.

On the same supporting body -30- an elastic ring -31- is press-fitted, which ring will contact the edge -32- of the guide for the paper band, under the pressure of springs -28- and -29-. Thus, the sliding of the cutter carriage on its guideways, originates, because of the friction between ring -31- and the surface -32-, the rotation of the supporting body -30- and therefore the rotation of the cutter -23- which overlaps stationary blade -33-, which is secured to the border of the surface -32- for guiding the paper band. An helical spring -34- assembled on shaft -22- effects a pushing action against the carrying body -30- on the shaft -22-, which has in its end a washer -35- against which the carrying body -30- abuts when the cutter carriage is out of the plotter, that is, in the case when the cutter carrying shaft has to be manually disassembled to change the cutter blade.

It is obvious that the cutter carriage according to the present invention is very simple and it does not require any independent devices for driving the rotating cutter, for which reason the cutter carriage dispenses with the traditional independent driving motors for the cutter or toothed belts to operate the cutter as well as other devices usually bringing higher mechanical complication and higher costs in known paper cutters.

On the other hand, and given the fact that the paper band is cut between a rotable cutter and a fixed blade cutter, the cut made on the paper band is of high quality in the whole width of the paper band.

It will be understood that, although the invention has been described in relation with its preferred embodiment shown as an example, the experts on the matter will be able to introduce changes in many of the details of the engageable cutter carriage of the present patent of invention, which will be included within the scope of the present invention as defined in the appended claims.

I claim:

1. A cutting device for a plotter for cutting a printed sheet moveable through the plotter in a first direction, said plotter comprising a print head carriage having a print head thereon, and means for moving said print head carriage transversely of said first direction and an electromagnet for moving said print head toward and away from said sheet for printing, said cutting device comprising a cutter carriage having a cutter wheel thereon, said cutter carriage being moveable by said print head carriage transversely of the direction of sheet travel, a cutter pickup hook pivotally affixed to said print head carriage, and a spring for biasing said hook toward a carriage disconnecting position, said electromagnet moving said hook to a position for connecting said print head carriage to said cutter carriage when said electromagnet moves said print head away from said sheet and said spring moving said hook to a position for disconnecting said cutter carriage from said print head carriage when said print head is moved toward said sheet for printing.

2. A cutting device according to claim 1, comprising a lever mounted on said print head carriage for pivotal movement about an axis parallel to the direction of movement of said print head carriage, said hook being on said lever and said magnet engaging said lever for pivoting said lever about said axis.

3. A cutting device according to claim 2, wherein said cutter wheel is rotatably mounted on a shaft, said shaft being affixed to said cutter carriage by a spring loaded swivel connection.

4. A cutting device according to claim 3, further comprising a resilient ring support on said cutter shaft, said ring support rolling on a transversely extending cutter bar against which said ring is biased by said spring loaded swivel connection.

5. A cutting device according to claim 4, further comprising a compression spring surrounding said shaft to bias said cutter wheel into engagement with said cutter bar.

6. A cutting device according to claim 5, wherein said spring loaded swivel connection includes a block affixed to said cutter shaft, said block being pivotally mounted in said cutter carriage with a connection which is easily disengageable with hand pressure.

* * * * *